(12) United States Patent
Moon et al.

(10) Patent No.: US 11,014,132 B2
(45) Date of Patent: May 25, 2021

(54) EXTRACTOR WITH END-MOUNTED POSITIVE PRESSURE SYSTEM

(71) Applicant: ILLINOIS TOOL WORKS INC., Glenview, IL (US)

(72) Inventors: Thomas Anthony Moon, De Pere, WI (US); Adam Joseph Frank, Menasha, WI (US); William Peter Maske, Bear Creek, WI (US)

(73) Assignee: Illinois Tool Works Inc., Glenview, IL (US)

( * ) Notice: Subject to any disclaimer, the term of this patent is extended or adjusted under 35 U.S.C. 154(b) by 40 days.

(21) Appl. No.: 14/801,567

(22) Filed: Jul. 16, 2015

(65) Prior Publication Data

US 2017/0014876 A1 Jan. 19, 2017

(51) Int. Cl.
*B08B 15/02* (2006.01)
*B23K 9/32* (2006.01)
*B08B 15/00* (2006.01)

(52) U.S. Cl.
CPC .......... *B08B 15/02* (2013.01); *B08B 15/002* (2013.01); *B23K 9/325* (2013.01)

(58) Field of Classification Search
CPC . B08B 2215/003; B08B 15/02; B08B 15/002; B23K 9/325; F24F 2009/007;
(Continued)

(56) References Cited

U.S. PATENT DOCUMENTS 2,185,919 A 1/1940 Kurth
2,210,458 A 8/1940 Keilholtz
(Continued)

FOREIGN PATENT DOCUMENTS

AU 637737 6/1993
BE 792270 3/1973
(Continued)

OTHER PUBLICATIONS

International Search Report & Written Opinion of PCT/US2012/022599 dated May 2, 2012.
(Continued)

*Primary Examiner* — Steven B McAllister
*Assistant Examiner* — Elizabeth M. May
(74) *Attorney, Agent, or Firm* — McAndrews, Held & Malloy, Ltd.

(57) ABSTRACT

An extractor system includes a negative pressure gas stream source, a negative pressure conduit, a housing, a positive pressure gas stream source, a positive pressure gas stream manifold, and an operator interface. The negative pressure conduit conveys the negative pressure gas stream from a work area. A first end of the negative pressure conduit is coupled to the negative pressure gas stream source, such that the negative pressure gas stream flows from the work area through a second end of the negative pressure conduit and toward the first end of the negative pressure conduit. The housing is disposed about the negative pressure conduit, near the second end of the negative pressure conduit comprising. The positive pressure gas stream source is coupled to the housing. The positive pressure gas stream manifold is located downstream of the positive pressure gas stream source. The positive pressure gas stream is directed through the positive pressure gas stream manifold. The operator interface allows a user to control the positive pressure gas stream through the positive pressure gas stream manifold.

34 Claims, 13 Drawing Sheets

(58) Field of Classification Search
CPC ........ F24F 9/00; F24F 2013/205; F24F 13/20; F24F 13/0254; F24F 13/0272; F24F 2013/0616
USPC .......................................................... 454/63
See application file for complete search history.

(56) References Cited

U.S. PATENT DOCUMENTS

| | | |
|---|---|---|
| 2,289,474 A | 7/1942 | Anderson |
| 2,367,104 A | 1/1945 | Demuth |
| 2,370,748 A * | 3/1945 | O'Donnell ............... E04G 7/16 24/329 |
| RE24,637 E | 4/1959 | Wulle |
| 2,910,558 A | 10/1959 | Engelhardt |
| 3,318,227 A | 5/1967 | Nelson |
| 3,364,664 A | 1/1968 | Doane |
| 3,430,551 A | 3/1969 | Hauville |
| 3,484,890 A | 12/1969 | Case |
| 3,487,767 A | 1/1970 | Kristiansen |
| 4,016,398 A | 4/1977 | Herrick |
| 4,043,257 A | 8/1977 | Aaberg |
| 4,158,462 A | 6/1979 | Coral |
| 4,160,407 A | 7/1979 | Duym |
| 4,163,650 A | 8/1979 | Bonham |
| 4,358,300 A | 11/1982 | Schlapman |
| 4,450,756 A | 5/1984 | Kling |
| 4,493,970 A | 1/1985 | Rieppel |
| 4,502,375 A | 3/1985 | Hignite |
| 4,552,059 A | 11/1985 | Potter |
| 4,607,614 A | 8/1986 | Higashino |
| 4,717,805 A | 1/1988 | Miyagawa |
| 4,856,419 A | 8/1989 | Imai |
| 4,905,716 A | 3/1990 | Hubbard |
| 4,969,923 A * | 11/1990 | Reeder .................. F16L 23/06 24/270 |
| 5,058,490 A | 10/1991 | Sodec |
| 5,069,197 A | 12/1991 | Wisting |
| 5,223,005 A | 6/1993 | Avondoglio |
| 5,263,897 A | 11/1993 | Kondo |
| 5,281,246 A | 1/1994 | Ray |
| 5,395,410 A | 3/1995 | Jang |
| 5,410,120 A | 4/1995 | Taylor |
| 5,427,569 A | 6/1995 | Plymoth |
| 5,540,214 A | 7/1996 | Boudreault |
| 5,713,346 A | 2/1998 | Kuechler |
| 5,716,268 A | 2/1998 | Strongin |
| 5,718,219 A | 2/1998 | Boudreault |
| 5,890,484 A | 4/1999 | Yamada |
| 6,037,725 A | 3/2000 | Tolbert, Jr. |
| 6,099,607 A | 8/2000 | Haslebacher |
| 6,332,837 B1 | 12/2001 | Wilk |
| 6,358,137 B1 | 3/2002 | Threlfall |
| 6,607,573 B1 | 8/2003 | Chaurushia |
| 6,616,720 B1 | 9/2003 | Smith |
| 6,620,038 B1 | 9/2003 | Kikuchi |
| 6,632,132 B1 | 10/2003 | Kikuchi |
| 6,780,213 B2 | 8/2004 | Chang |
| 7,000,634 B2 | 2/2006 | Lindborg |
| 7,559,962 B2 | 7/2009 | Miller |
| 7,581,539 B2 | 9/2009 | Aviles |
| 7,959,696 B2 * | 6/2011 | Martic ................ F24C 15/2028 126/299 F |
| 8,176,766 B1 | 5/2012 | Ruiz |
| 8,211,194 B2 | 7/2012 | Takayanagi |
| 8,312,873 B2 | 11/2012 | Gagas |
| 8,460,417 B2 | 6/2013 | Reid |
| 8,892,222 B2 | 11/2014 | Simms |
| 2002/0039881 A1 | 4/2002 | Coral |
| 2003/0181158 A1 | 9/2003 | Schell |
| 2005/0170767 A1 | 8/2005 | Enzenroth |
| 2005/0204582 A1 | 9/2005 | Rossi |
| 2006/0157048 A1 | 7/2006 | Heilman |
| 2006/0259195 A1 | 11/2006 | Eliuk |
| 2007/0039608 A1 | 2/2007 | Chang |
| 2007/0202791 A1 | 8/2007 | Lee |
| 2008/0278040 A1 | 11/2008 | McCarthy |
| 2008/0305731 A1 | 12/2008 | Reid |
| 2009/0088060 A1 | 4/2009 | Arnold |
| 2009/0321403 A1 | 12/2009 | Brenneke |
| 2010/0206799 A1 | 8/2010 | Leavitt |
| 2010/0282728 A1 | 11/2010 | Cole |
| 2012/0193334 A1 | 8/2012 | Mehn |
| 2013/0122795 A1 | 5/2013 | Hammers |
| 2013/0162177 A1 | 6/2013 | Hofsdal |
| 2013/0244555 A1 | 9/2013 | Hammers |
| 2013/0244556 A1 | 9/2013 | Hammers |
| 2013/0244557 A1 | 9/2013 | Hammers |
| 2013/0244558 A1 * | 9/2013 | Hammers ............... B08B 15/02 454/63 |
| 2013/0244559 A1 | 9/2013 | Hammers |
| 2013/0244560 A1 | 9/2013 | Hammers |
| 2014/0213164 A1 | 7/2014 | Leisner |
| 2014/0214213 A1 | 7/2014 | Rockenfeller |
| 2014/0253008 A1 | 9/2014 | Sykes |
| 2015/0000232 A1 | 1/2015 | Hammers |
| 2015/0004895 A1 | 1/2015 | Hammers |

FOREIGN PATENT DOCUMENTS

| | | |
|---|---|---|
| CH | 682512 | 9/1993 |
| CN | 2043140 | 8/1989 |
| CN | 2121638 | 11/1992 |
| CN | 2129656 | 4/1993 |
| CN | 2146665 | 11/1993 |
| CN | 2225253 | 4/1996 |
| CN | 2413708 | 1/2001 |
| CN | 1384909 | 12/2002 |
| CN | 2593015 | 12/2003 |
| CN | 2897469 | 5/2007 |
| CN | 200984583 | 12/2007 |
| CN | 101332392 | 12/2008 |
| CN | 201609707 | 10/2010 |
| CN | 201644480 | 11/2010 |
| CN | 101327109 | 12/2011 |
| CN | 202087569 | 12/2011 |
| CN | 102483240 | 5/2012 |
| CN | 101526239 | 7/2012 |
| CN | 102699002 | 10/2012 |
| CN | 203008443 | 6/2013 |
| CN | 104302981 | 1/2015 |
| DE | 1604293 | 9/1970 |
| DE | 3412204 | 10/1985 |
| DE | 3716257 | 11/1988 |
| DE | 4413600 | 11/1995 |
| DE | 10020736 | 10/2001 |
| DE | 20221100 | 1/2005 |
| DE | 102005016721 | 10/2006 |
| DE | 102005033224 | 7/2007 |
| DE | 102006055001 | 5/2008 |
| DE | 102009030220 | 12/2010 |
| EP | 0511576 | 11/1992 |
| EP | 0536871 | 4/1993 |
| EP | 1227283 | 7/2002 |
| EP | 1967796 | 9/2008 |
| EP | 2368646 | 9/2011 |
| EP | 2422865 | 2/2012 |
| FR | 2208317 A6 * | 6/1974 ............. B08B 15/02 |
| FR | 2613551 | 10/1988 |
| FR | 2911520 | 7/2008 |
| GB | 546878 | 8/1942 |
| GB | 1069868 A | 5/1967 |
| GB | 2030825 | 5/1980 |
| GB | 2032825 A | 5/1980 |
| JP | S54147647 | 11/1979 |
| JP | H01179841 | 7/1989 |
| JP | H04063183 | 2/1992 |
| JP | H06292970 | 10/1994 |
| JP | H0833227 | 2/1996 |
| JP | H10288371 | 10/1998 |
| JP | 2005279200 | 10/2005 |
| JP | 2008070049 | 3/2008 |
| WO | 0048752 A1 | 8/2000 |
| WO | 0184054 | 11/2001 |
| WO | 2004088812 | 10/2004 |

(56) References Cited

FOREIGN PATENT DOCUMENTS

| | | |
|---|---|---|
| WO | 2005022046 | 3/2005 |
| WO | 2005045323 | 5/2005 |
| WO | 2005106337 | 11/2005 |
| WO | 2008032571 | 3/2008 |

OTHER PUBLICATIONS

International Search Report from PCT application No. PCT/US2014/011860, dated Apr. 24, 2015, 10 pgs.
International Search Report from PCT application No. PCT/US2014/036956, dated Aug. 29, 2014, 14 pgs.
International Search Report from PCT application No. PCT/US2014/044119, dated Sep. 10, 2014, 10 pgs.
International Search Report from PCT application No. PCT/US2012/064081 dated Feb. 14, 2013, 12 pgs.
International Search Report from PCT application No. PCT/US2013/030694 dated Aug. 20, 2013, 15 pgs.
International Search Report from PCT application No. PCT/US2013/030697 dated Jul. 30, 2013, 13 pgs.
International Search Report from PCT application No. PCT/US2013/031237 dated Jul. 23, 2013, 11 pgs.
International Search Report from PCT application No. PCT/US2013/031246 dated Aug. 9, 2013, 13 pgs.
International Search Report from PCT application No. PCT/US2013/031251 dated Aug. 6, 2013, 15 pgs.
International Search Report from PCT application No. PCT/US2013/031261 dated Jul. 25, 2013, 13 pgs.
Canadian Office Action Appln No. 2,929,363 dated Jun. 18, 2019.
European Office Action Appln No. 16794793.6 dated Jun. 19, 2020 (4 pages).

\* cited by examiner

EXTRACTOR WITH END-MOUNTED POSITIVE PRESSURE SYSTEM

BACKGROUND

The present disclosure relates generally to systems for extracting fumes or airborne components from air streams, such as in welding, cutting, metal working, wood working, and other applications.

A wide range of industrial, commercial, hobby and other applications result in airborne components that can be removed with proper extraction and filtering. Metal working operations, for example, including cutting, welding, soldering, assembly, and other processes may generate smoke, particulate, and fumes. In some shops it may be convenient simply to open ambient air passages or to use negative pressure or discharge air from fans to maintain relatively clear air spaces. In other applications, cart-type fume extractors are used. In industrial settings, more complex fixed systems may be employed for extracting fumes from specific works cells, metal working locations, and so forth. In other settings, such as machine shops, woodworking shops, worksites where cutting, sanding and other operations are performed, dust, fumes, particulate and other types of airborne components may be generated that it may be desirable to collect and extract from work areas and controlled spaces.

A number of systems have been developed for fume extraction, and a certain number of these are currently in use. Some of these systems use negative pressure air to draw fumes and smoke from the immediate vicinity of the metal working operation, and to filter the fumes and smoke before returning the air to the room or blowing the air to an outside space. Further improvements are needed, however, in fume extraction systems.

BRIEF DESCRIPTION

In a first embodiment an extractor system includes a negative pressure gas stream source, a negative pressure conduit, a housing, a positive pressure gas stream source, and a positive pressure gas stream manifold. The negative pressure conduit conveys the negative pressure gas stream from a work area. A first end of the negative pressure conduit is coupled to the negative pressure gas stream source, such that the negative pressure gas stream flows from the work area through a second end of the negative pressure conduit and toward the first end of the negative pressure conduit. The housing is disposed about the negative pressure conduit, near the second end of the negative pressure conduit comprising. The positive pressure gas stream source is coupled to the housing. The positive pressure gas stream manifold is located downstream of the positive pressure gas stream source. The positive pressure gas stream is directed through the positive pressure gas stream manifold.

In a second embodiment, an extractor system includes a negative pressure system and a positive pressure system. The negative pressure system includes a negative pressure gas stream source and a negative pressure conduit. The negative pressure conduit has a first end coupled to the negative pressure gas stream source, and a second end near a work area. The negative pressure gas stream is conveyed from the work area, through the second end, and toward the first end. The positive pressure system includes a housing disposed about the negative pressure conduit near the second end, a positive pressure gas stream source within to the housing, and a positive pressure gas stream manifold downstream of the positive pressure gas stream source, wherein the positive pressure gas stream is directed through the positive pressure gas stream manifolds.

In a third embodiment, a method includes coupling a positive pressure system to a first end of a negative pressure conduit of a negative pressure system, wherein a negative pressure gas stream source coupled to a second end of the negative pressure conduit directs a negative pressure gas stream from a work area, through the first end of the negative pressure conduit and toward the second end, and wherein the positive pressure system includes a positive pressure gas stream source and a positive pressure gas stream manifold fluidly coupled to the positive pressure gas stream source and disposed about the negative pressure conduit.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Furthermore, any numerical examples in the following discussion are intended to be non-limiting, and thus additional numerical values, ranges, and percentages are within the scope of the disclosed embodiments.

Figure 1:
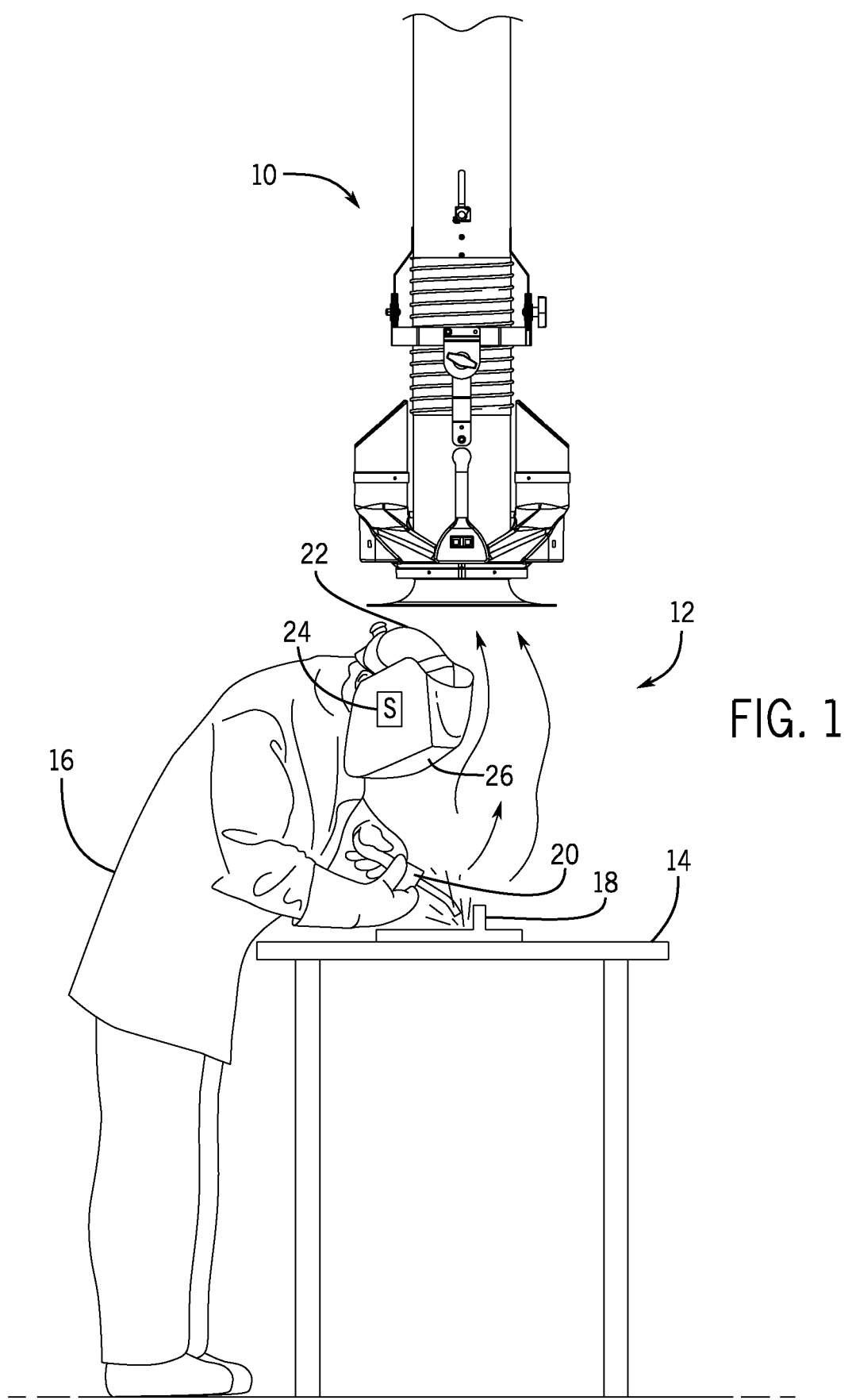
FIG. 1 is one embodiment of a fume extraction system in accordance with aspects of the present disclosure.

Turning now to the figures, FIG. 1 illustrates one embodiment of a fume extraction system 10 being used during a welding operation. It should be understood however, that welding is merely an example and that a wide range of industrial, commercial, hobby and other applications may result in fumes, smoke, or other airborne components that can be removed by the extraction system 10. Metal working operations, for example, cutting, welding, soldering, assembly, and other processes may generate smoke, particulate, and fumes. In machine shops, woodworking shops, worksites where cutting, sanding and other operations are performed, dust, fumes, particulate and other types of airborne components may be generated that it may be desirable to collect and extract from work areas and controlled spaces. In some applications, the extraction system 10 is placed in the work area 12 (e.g., work cell), in the vicinity of (e.g., above) the work surface 14. As a user 16 (e.g., a welder) performs a work operation (e.g., a welding operation) on a workpiece 18 using a tool 20 (e.g., welding torch), the extraction system 10 may draw fumes and smoke from the work area 12. The user may utilize a helmet 22 (e.g., welding helmet) or other protective headwear, which may include one or more sensors 24. The one or more sensors 24 may be configured to sense one or more parameters indicative of the working environment or other parameters related to the work operation (e.g., fumes, temperature, humidity, light, motion, etc.). Additionally, the protective headwear may include a window 26. The window 26 may be a transparent, translucent, or opaque material. For example, the window may be a completely transparent or tinted materials that allows the user 16 to directly view the work surface 14 and the tool 20 during the performance of the work operation. In other embodiments, the window 26 may include one or more displays (e.g., LCD, plasma, virtual reality, augmented reality, LEDs, and the like), which may provide the user 16 with information while performing the work operation. In yet other embodiments, the window 26 may be completely opaque, but have a display that shows video from a camera or a virtual reality setting that allows the user 16 to see what he or she is doing. In other embodiments, the window 26 may be transparent or translucent and have a display overlaid on the window 26 to provide alerts, metrics, or an augmented reality setting for the user 16.

It should be noted that the "airborne components" discussed in the present disclosure may include any substance that is borne by, suspended in or otherwise carried by the air, or more generally the fluid present in the area considered. Depending upon the application, the airborne components may be in an aerosol form, such as solid, liquid or gaseous phase particles that are suspended in air. Such airborne components may form smoke, fumes (including chemical fumes), or clouds present or given off by an operation ongoing in the area, whether or not visible to the human operators. In other applications, the airborne components may be at least temporarily airborne but not suspended in the air, such as in the case of larger particulate, such as droplets, mist (e.g., from oils, coolants, and so forth), dust (e.g., from drywall, grain, minerals, cements, or other dust sources), chips, debris, and so forth. The present techniques are directed to collecting and extracting any such airborne components in the manners described. Similarly, reference is made in this disclosure to "air" or "airborne", although the fluid in which the airborne components are found and that is circulated by the system may be, more generally, a gaseous substance that need not contain the same constituents, or in the same ratios as found in atmospheric air. Such gasses are intended nevertheless be included in the term "air" or "airborne". Moreover, it is presently contemplated that the same principles of fluid dynamics and borne component removal may be applied to other "fluids" than air or gasses (including liquids), and to that extent the teachings of the present disclosure are intended to extend to those applications.

A number of systems have been developed for fume extraction, some of which are currently in use. Some of these systems use negative pressure air to draw fumes and smoke from the immediate vicinity of the metal working operation, and to filter the fumes and smoke before returning the air to the work area 12 or blowing the air to an outside space. Other systems may use a combination of negative pressure zones (e.g., suction air) and positive pressure zones Improvements to the ability to control the positive pressure gas stream (e.g., the direction of the gas stream, the flow rate of the air, etc.) may improve the effectiveness of the extraction system and the versatility of the extraction system to be used in a variety of different workspaces and configurations. Furthermore, the disclosed techniques may be used to retrofit existing extraction systems that only use a negative pressure zone (e.g., suction air).

Disclosures and more detailed descriptions of exemplary fume collection systems and techniques are set forth in U.S. patent application Ser. No. 13/610,490 entitled "WELDING FUME EXTRACTOR," filed on Sep. 11, 2012, U.S. patent application Ser. No. 13/767,551 entitled "AIRBORNE COMPONENT EXTRACTOR WITH ADJUSTABLE FLOW RATES," filed on Feb. 14, 2013, U.S. patent application Ser. No. 13/753,398 entitled "FUME EVACUATION SYSTEM," filed on Jan. 29, 2013, U.S. patent application Ser. No. 13/767,601 entitled "AIRBORNE COMPONENT EXTRACTOR WITH IMPROVED FLOW PATHS," filed on Feb. 14, 2013, U.S. patent application Ser. No. 13/767,643 entitled "OPTIMIZED AIRBORNE COMPONENT EXTRACTOR," filed on Feb. 14, 2013, U.S. patent application Ser. No. 13/767,685 entitled "AIRBORNE COMPONENT EXTRACTOR MANIFOLD," filed on Feb. 14, 2013, U.S. patent application Ser. No. 13/767,716 entitled "AIRBONE COMPONENT EXTRACTOR WITH IMPROVED POWER AND PRESSURE PERFORMANCE," filed on Feb. 14, 2013, U.S. patent application Ser. No. 13/767,745 entitled "AIRBORNE COMPONENT EXTRACTOR HOOD," filed on Feb. 14, 2013, U.S. patent application Ser. No. 14/300,598 entitled "AIRBORNE COMPONENT EXTRACTOR WITH BAFFLED DEBRIS COLLECTION," filed on Jun. 10, 2014, U.S. patent application Ser. No. 14/014,756 entitled "THREE-PHASE PORTABLE AIRBORNE COMPONENT EXTRACTOR WITH ROTATIONAL DIRECTION CONTROL," filed on Aug. 30, 2013, all of which are hereby incorporated into the present disclosure by reference in their entireties.

Figure 2:
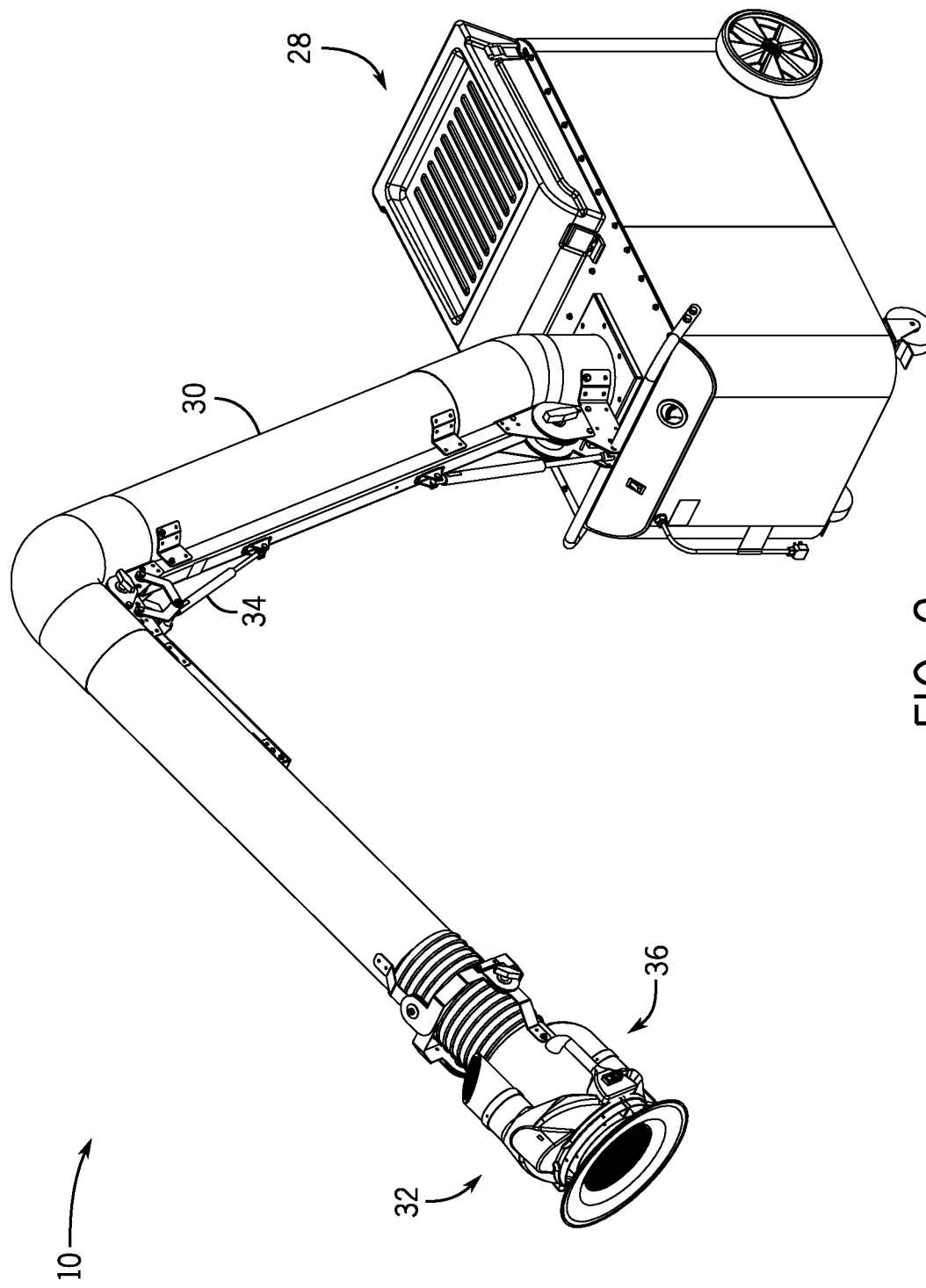
FIG. 2 is a perspective view of an embodiment of the extraction system of FIG. 1 in a mobile cart-type configuration in accordance with aspects of the present disclosure.

FIG. 2 is a perspective view of an embodiment of the extraction system 10 in a mobile cart-type configuration. In the cart-type extraction system 10 shown in FIG. 2, the extraction system 10 may include a suction cart 28, an arm 30, support bracketry 34, and a positive pressure head 36. As previously discussed, the extraction system 10 may be provided as a complete system, as a replacement arm 30 and pressure head 36, the positive pressure head 36 by itself, or some combination thereof separately as an add-on or retrofit kit. The system may or may not include support bracketry 34m which may help the arm 30 to support the weight of the pressure head 36. The suction cart 28 provides negative pressure to draw the smoke, fumes, or airborne components away from the work area 12. The suction cart 28 may expel the air it draws in to an exhaust duct, out a window, an open door, or some other place outside of the work cell 12. The suction cart 28 may include a filtration system. The filtration system may be configured to filter the air drawn into the suction cart 28 before expelling the air to a location outside the work cell 12, or the filtration system may release the filtered air back into the work cell 12. The arm 30, which is a hollow tube, may be connected to the suction cart. The arm 30 may be a typical extraction arm, typically 8 or 10 inches in diameter, but may be of another size. The suction cart 28 draws air into the end 32 of the arm and through the arm 30, creating a negative pressure zone at the end 32 of the arm 30 opposite the suction cart 28, allowing the user 16 the ability to apply negative pressure to specific areas within the work cell 12. The support bracketry 34 may be attached to the arm 30 and assist in positioning and/or support the load of the arm 30. The positive pressure head 36 is attached to the end 32 of the arm 30 and may be configured to blow air radially outward, creating a positive pressure zone at the end of the arm 30. A positive pressure zone may improve the ability of the extraction system 10 to draw smoke, fumes, and airborne components into the arm 30. The specifics of the positive pressure head 36 and the positive pressure zone will be discuss in more detail with regard to FIGS. 11 and 12.

Figure 3:
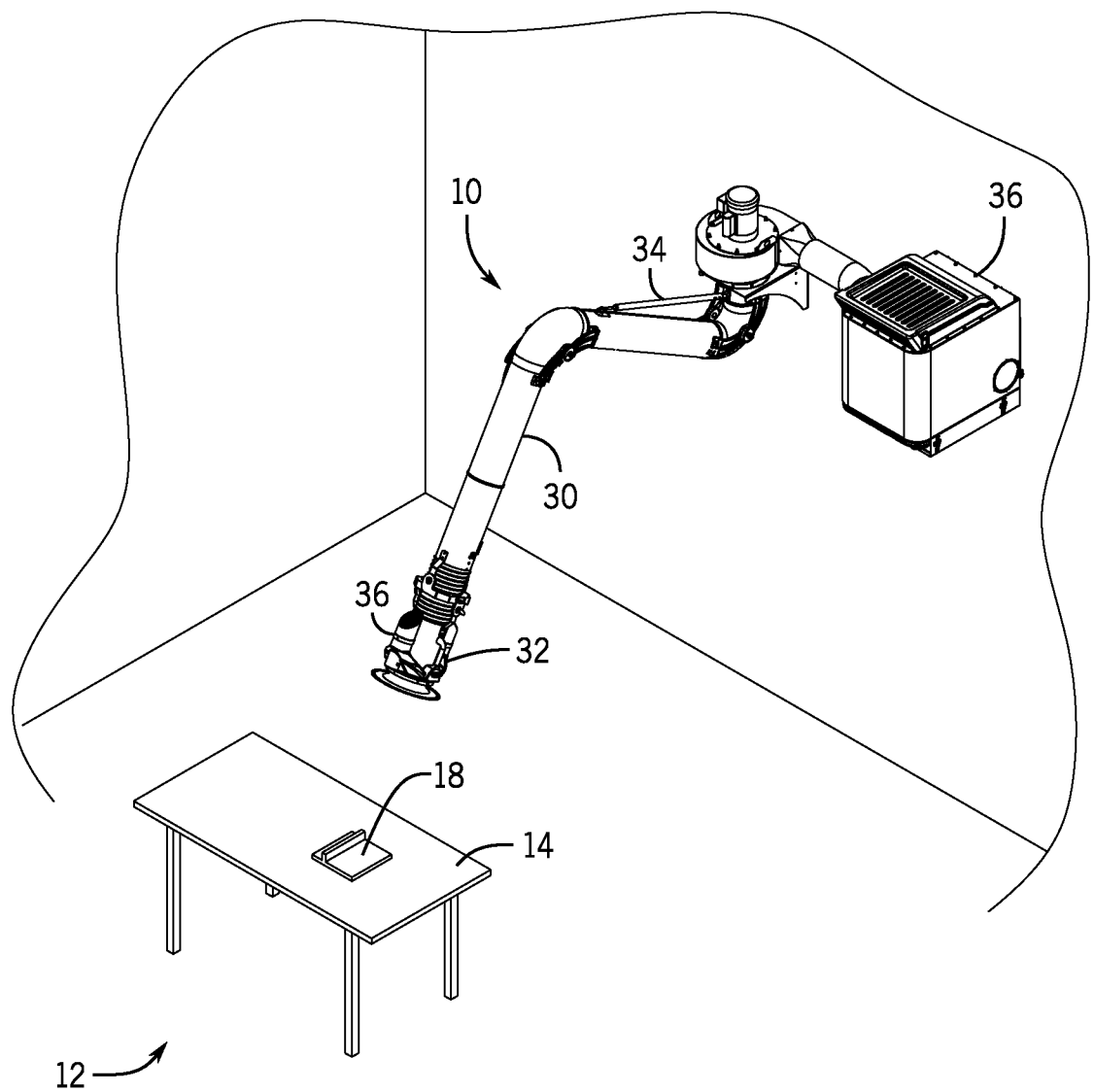
FIG. 3 is a perspective view of an embodiment of the extraction system of FIG. 1 in a stationary floor-mounted or wall-mounted configuration in accordance with aspects of the present disclosure.

FIG. 3 is a perspective view of an embodiment of the extraction system 10 in a stationary floor-mounted or wall-mounted configuration. The extraction system 10 shown in FIG. 3 is similar to that shown in FIG. 2, except that the negative pressure is provided by a stationary negative pressure system 38 rather than a suction cart 28. Similarly, the extraction system 10 includes an extraction arm 30 coupled to the stationary negative pressure system 38. As with the embodiment shown in FIG. 2, the extraction system 10 may be provided as a complete system, as a replacement arm 30 and pressure head 36, the positive pressure head 36 by itself, or some combination thereof separately as an add-on or retrofit kit. The system may or may not include support bracketry 34m which may help the arm 30 to support the weight of the pressure head 36. The user may move the arm 30 to position the end 32 of the arm 30 in the work area 12. A positive pressure head 36 is disposed on the end of the arm 30 and is configured to blow air in order to create a positive pressure zone and improve the performance of the extraction system 10 relative to a system that only uses negative pressure. The arm 30 may be outfitted with support bracketry 34 in order to support the cantilevered load of the positive pressure head 36 and the arm 30, and to help the user 16 position the arm.

Figure 4:
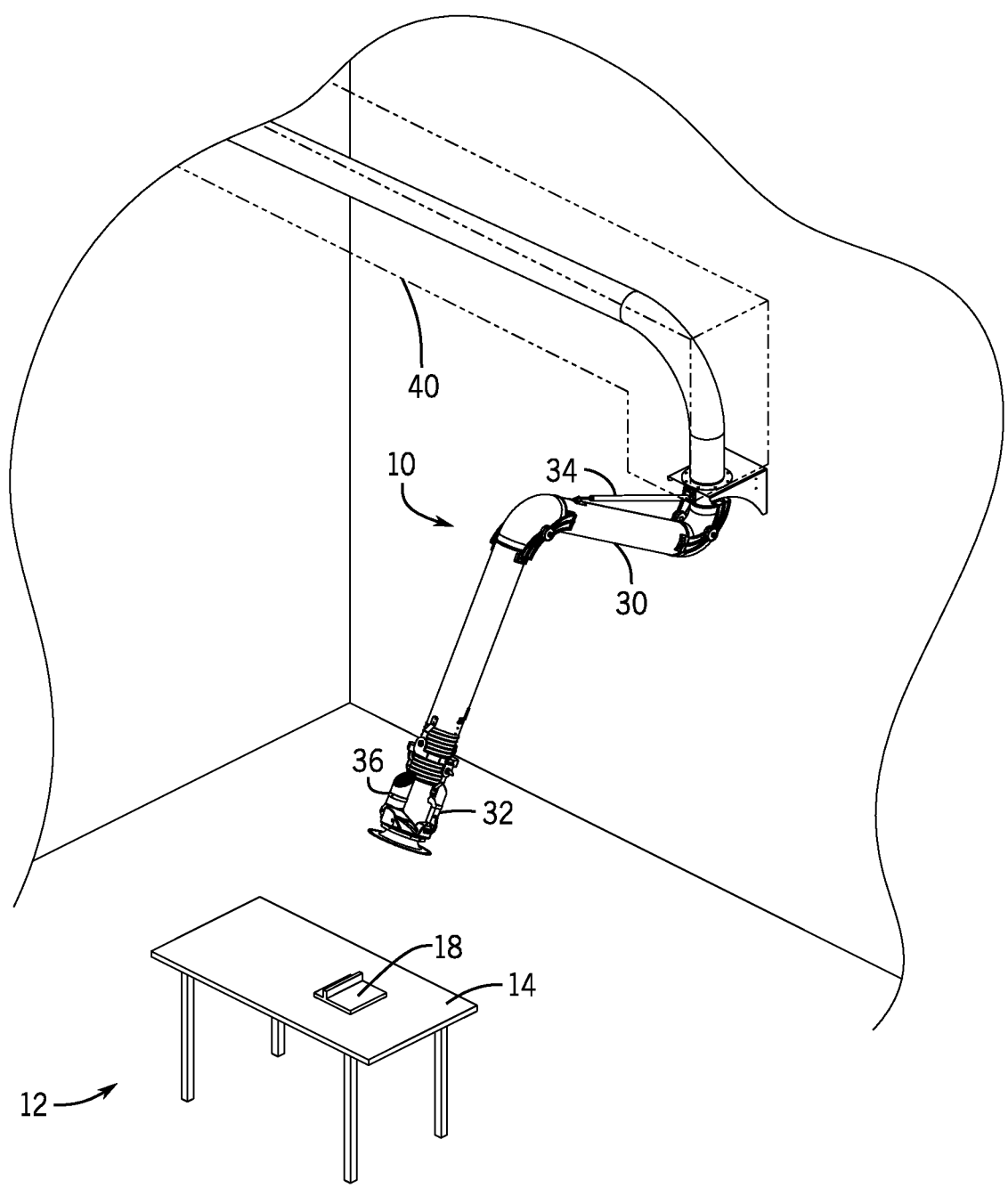
FIG. 4 is a perspective view of an embodiment of the extraction system of FIG. 1 in a ducted configuration in accordance with aspects of the present disclosure.

FIG. 4 is a perspective view of an embodiment of the extraction system 10 in a ducted configuration. The extraction system 10 shown in FIG. 4 is similar to that shown in FIGS. 2 and 3, except that the negative pressure is provided by a ducted negative pressure system 40 rather than a suction cart 28 or a stationary negative pressure system 38. As with the embodiment shown in FIG. 2, the extraction system 10 may be provided as a complete system, as a replacement arm 30 and pressure head 36, the positive pressure head 36 by itself, or some combination thereof separately as an add-on or retrofit kit. The system may or may not include support bracketry 34m which may help the arm 30 to support the weight of the pressure head 36. Factories, shops, or other industrial applications set up with a significant number of work cells 12 may utilize a duct-based system to extract smoke, fumes, and other airborne components. The ducted negative pressure system 40 may be configured to draw air out of the various work cells 12 and expel the air outside or recirculate the air throughout the work cells. The air may be filtered before being recirculated or expelled. As with the systems of FIGS. 2 and 3, the extraction system 10 includes an arm 30 coupled to the stationary negative pressure system 38. The user may move the arm 30 to position the end 32 of the arm 30 in the vicinity of the work surface 14. A positive pressure head 36 is disposed on the end of the arm and is configured to blow air in order to create a positive pressure zone and improve the performance of the extraction system 10 relative to a system that only uses negative pressure. The arm 30 may be outfitted with support bracketry 34 in order to support the cantilevered load of the positive pressure head 36 and the arm 30, and to help the user 16 position the arm.

Figure 5:
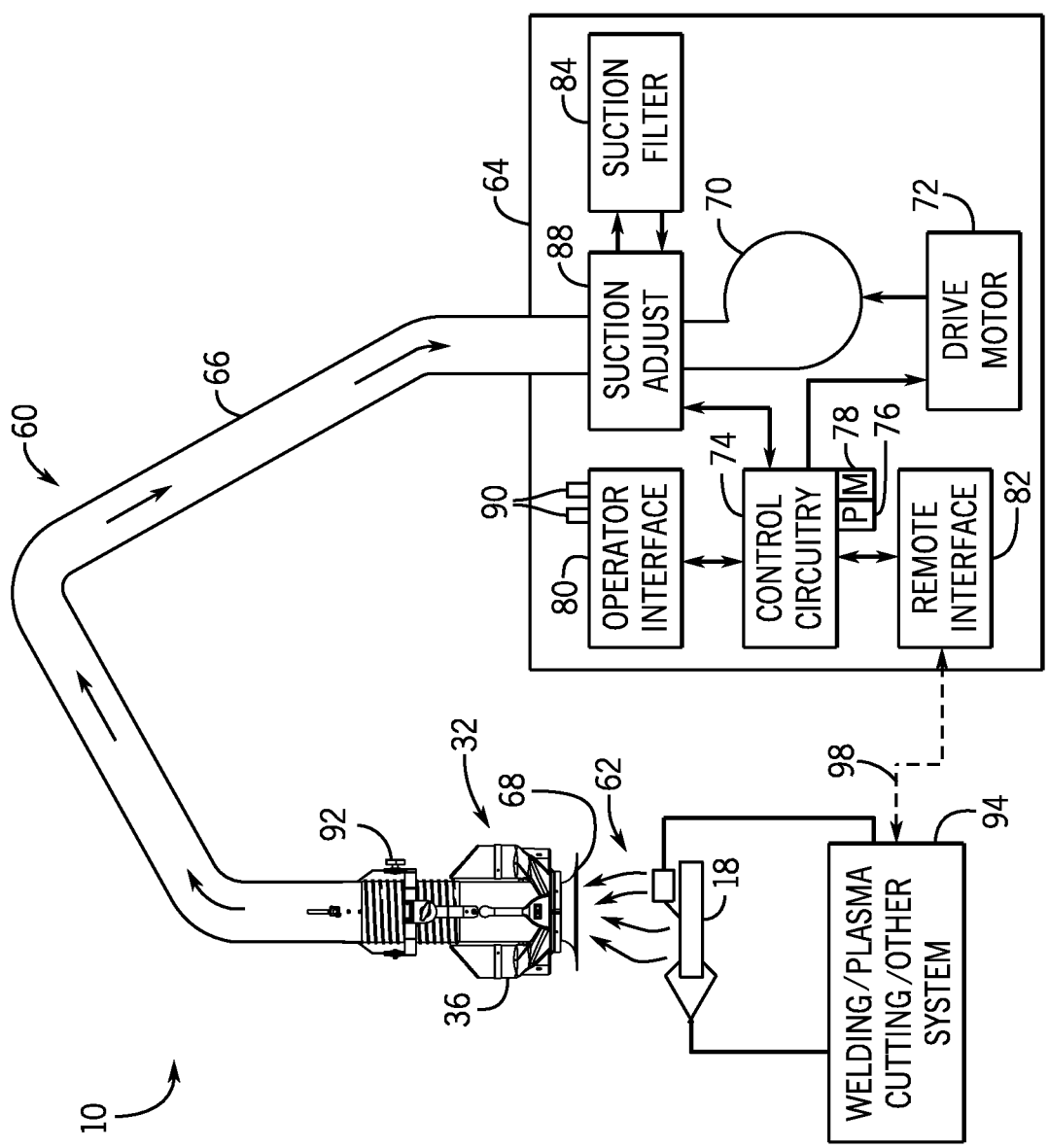
FIG. 5 is a schematic of an embodiment of the extraction system in accordance with aspects of the present disclosure.

The extraction system 10 shown in FIGS. 2-4 may include separate systems for providing negative pressure (to create a negative pressure zone) and blowing (to create a positive pressure zone). FIG. 5 is a schematic of the extraction system 10 illustrating the negative pressure system 60 for extracting workspace air as indicated by reference numeral 62 from a work area 12. It should be understood, however, that this is merely an example and that the positive pressure head may also me mounted to a "push-pull" system that uses both positive pressure and negative pressure to extract air from a workspace. In such an embodiment, the positive pressure head 36 may be used to add additional positive pressure. The negative pressure system 60 shown in FIG. 5 comprises a base unit 64, including a negative pressure gas stream source, coupled to one or more conduits 66 that channel air from a hood 68. The hood 68 is designed to be placed at or near the work area 12 and, when the base unit is activated, serves to create negative pressure zone of air around the work area 12 and to extract the workspace air 62, directing extracted air to the base unit 64 for processing.

It should be noted that while in certain embodiments described in the present disclosure a stand-alone base unit 16, and in one presently contemplated embodiment a cart-type unit (e.g., suction cart 28) is described, the present techniques are not limited to any particular physical configuration. More generally, innovations provided by and described in the present disclosure may be implemented into fixed or semi-fixed installations, such as those used in industrial, commercial, hobby, and other settings. That is, certain of the components of the base unit described herein may serve multiple workspaces, work cells 12, weld cells, work locations and areas, and so forth, by common conduits (e.g., ducted negative pressure system 40) that draw air and airborne components from multiple work areas 12. Operator controls, where provided as described below, may be positioned remotely from these workspaces, or within the workspaces for control of flow to and from the particular workspace.

As illustrated in FIG. 5, the base unit 64 comprises a blower 70, or other negative pressure gas stream source, such as a squirrel-cage blower, driven by a drive motor 72. The drive motor 72 is controlled by control circuitry 74 which may provide drive signals to the motor for fixed-speed or variable-speed operation. The base unit 64 may be designed to draw power from any source, such as the power grid, battery sources, engine-generator sets, and so forth. The control circuitry 74 typically includes a processor 76 and memory 78 for carrying out drive operations as desired by the operator or in response to system inputs as described below. Accordingly, the control circuitry 74 may communicate with an operator interface 80 for receiving operator settings, speed settings, on-off commands, and so forth. Similarly, the control circuitry 74 may communicate with a remote interface 82 designed to receive signals from remote inputs, remote systems, and so forth. The remote interface may also provide data to such remote systems such as for monitoring and/or controlling operation of the negative pressure system 60, and in some cases the entire extraction system 10.

The conduit 66 extending between the base unit 64 and the hood 68 is a negative pressure air conduit. In general, the negative pressure air conduit 66 is under a negative or slight suction pressure to draw air containing the airborne components from the workspace 12. The air flowing from the conduit 66 may be directed through a suction filter 84 before being introduced into the blower 70. The air may then be reintroduced to the workspace, recirculated in the factory, or expelled from the factory. As described below, the system may also include components designed to allow for adjustment of the flow rate of the negative pressure air stream. The extraction system of FIG. 5 also includes a positive pressure head 36, which will described in more detail with regard to FIGS. 6-9.

As noted above, the present techniques may allow for adjustment of the negative pressure air flow to optimize operation of the system 10. Several different techniques are presently contemplated for such adjustment. For example, in the embodiment illustrated in FIG. 5, a negative pressure air adjustment 88 may be provided before the suction filter 84. This adjustment may comprise, for example, a bypass valve, a louver, or other mechanical device which may be adjusted to limit the flow of air from the suction filter and, consequently, the intake of air into the blower 70 from the ambient surroundings. In some cases, this adjustment may allow some air to exit to the environment, as illustrated in FIG. 5. Such adjustment may advantageously allow for relative mass or volumetric flow rates of the negative pressure airstream to enhance creation of the air region and extraction of workspace air. In an alternative configuration, manual adjustment of the negative pressure air stream may be replaced by electronic control via inputs, designated by reference numeral 90. These may be provided on the base unit, such as through adjustment dials, membrane switches, operator touch controls, and so forth. Still further, manual and/or electronic adjustment of one or both airstreams may be provided at the hood 68. In the embodiment illustrated in FIG. 5, for example, electronic inputs 92 are provided for both adjustments. These are communicated to the remote interface 82 of the base unit which, in turn, communicates them to the control circuitry 74. The control circuitry may be coupled to any suitable device, such as the negative pressure adjustment 88 to regulate their operation (e.g., via small adjustment motors and actuator assemblies). It should also be noted that adjustments to flow rates for the negative pressure airstream may be made by altering the speed of one or more motors and/or blowers, fans or compressors.

It should also be noted that a system may be adapted to exchange data with other system components, such as a welding/plasma cutting or other system 94. The system 94 may include, for example, welding or plasma cutting power supplies, wire feeders, shielding gas supplies, and so forth. In other metal working settings, the system may include various other manual and machine tools. In still other settings, the system may include various robots, production lines, power tools (e.g., saws, workstations, etc.). These will typically be coupled to the operation to accomplish the desired task on a workpiece 18. Certain of these systems may be capable of providing control signals to the extraction system to allow for turning the extraction system on and off, regulating speeds and air flows, and so forth. Such communications may be provided via suitable cabling 98 or by other means by wireless communications.

It should be understood that FIG. 5 shows just one possible embodiment of the base unit 64, and that other alternative configurations and interconnections of the components of the base unit 64 may be possible. In particular, the filter 84 may be placed downstream of the blower 70, and the negative pressure adjustment 88 may direct air into the blower directly. In this case, the filter 84 may directly discharge the air. In the alternative, the suction filter 84 may be placed upstream of the negative pressure adjustment 88, which here again directs air into the blower.

Here again, it should be noted as well that although separate adjustment mechanisms are described, a single adjustment could be provided that allows for simply adjusting the ratio of the flow rates, such as via a single knob or input at a base unit, at the hood, or at any convenient location.

Figure 6:
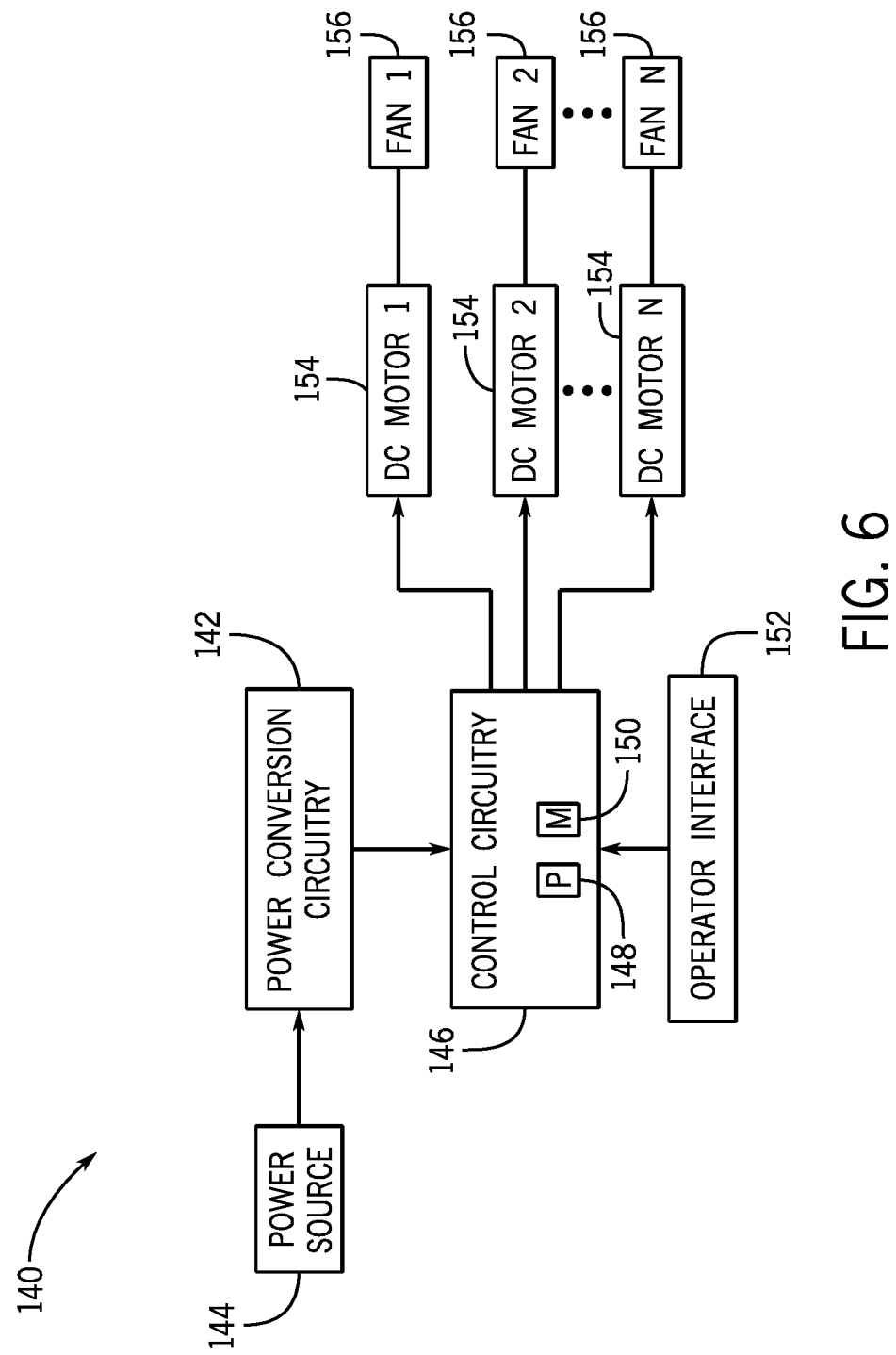
FIG. 6 is a schematic of a positive pressure system in accordance with aspects of the present disclosure.

FIG. 6 is a schematic of the positive pressure system 140, which provides a positive pressure air flow. The positive pressure system 140 may include power conversion circuitry 142, configured to draw power from a power source 144 and convert it to the appropriate power (e.g., 24 volt DC power, 48 volt DC power, or some other power). For example, the power conversion circuitry may be a transformer configured to take 15 amp, 110 volt AC power and convert it to 10 amp, 48 volt DC power or 20 amp, 24 volt DC power. The power conversion circuitry may be mounted at the base of the extraction arm 30, on a wall in the work cell 12, inside of or on the suction cart 28, or the stationary negative pressure system, or elsewhere with wiring routed along the length of the extraction arm 30. In the embodiment shown in FIG. 6, the power conversion circuitry only converts power for the positive pressure system 140. In other embodiments, the power conversion circuitry 142 may convert power for both the positive pressure system 140 and the negative pressure system 60. The positive pressure system 140 may also include control circuitry 146 configured to control to operation of the positive pressure system 140. In the embodiment shown in FIG. 6, the control circuitry 146 is different from the control circuitry 74 of the negative pressure system 60 shown in FIG. 5. However, the negative pressure system 60 and the positive pressure system 140 may share a single set of control circuitry 74, 146. The control circuitry 146 may include a processor 148 configured to execute instructions, analyze data from sensors 24, run programs, and the like. The positive pressure system 140 may include an operator interface 152 to communicate with the user 16. The operator interface 152 may include a display and/or inputs. The operator interface 152 may display one or more parameters of operation of the positive pressure system 140 or the larger extraction system 10, and/or receive commands from the user 16 (e.g., turn on, turn off, adjust flow rates, etc.). As with the control circuitry 146, the operator interface 152 for the positive pressure system 140 may or may not be the same as or different from the operator interface 80 of the negative pressure system 60.

The control circuitry 146 may implement commands from the operator interface 152 in controlling one or more DC motors 154 connected to one or more fans 156. Though the DC motors 154 connected to fans 156 are shown in FIG. 6, it should be understood that this is merely an example. It should be understood that any source of positive pressure gas stream may be used (e.g., AC motors, a ducted fan, a compressor, a centrifugal blower, turbo powered plans, etc.) Each of the one or more DC motors 154 may be configured to rotate one of the one or more fans 156 at high speed (e.g., approximately 12,000 rpm), blowing air into one or more manifolds. In some embodiments, however, the fans may spin at a significantly slower rate than 12,000 rpm. The DC motors 154 may be configured to run at 24 volts DC, 48 volts DC, or some other voltage.

Figure 7C:
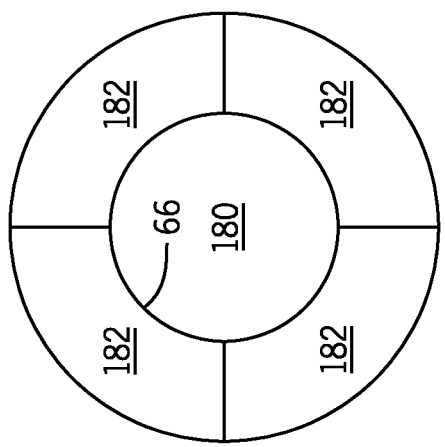
FIG. 7C shows an embodiment of the segmented positive pressure gas stream manifolds in which four positive pressure gas stream manifolds surround the negative pressure conduit in accordance with aspects of the present disclosure.
Figure 7B:
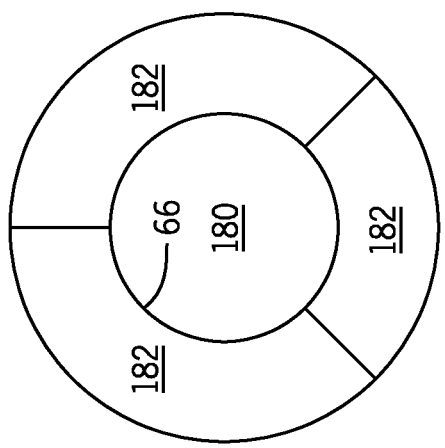
FIG. 7B shows an embodiment of the segmented positive pressure gas stream manifolds in which three positive pressure gas manifolds surround the negative pressure conduit in accordance with aspects of the present disclosure.
Figure 7A:
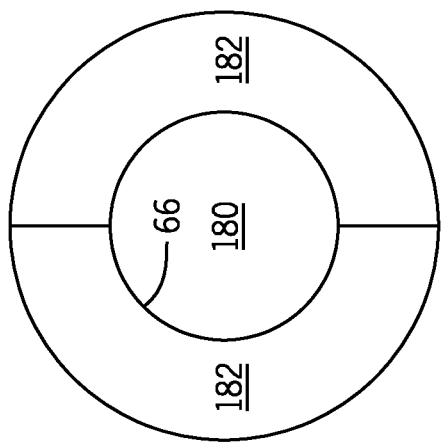
FIG. 7A shows an embodiment of the segmented positive pressure gas stream manifolds in which two positive pressure gas stream manifolds surround the negative pressure conduit in accordance with aspects of the present disclosure.

FIGS. 7A, 7B, and 7C show cross sectional views of the various embodiments of the segmented positive pressure gas stream manifolds and negative pressure manifolds. In the embodiments shown in FIGS. 7A, 7B, and 7C, the manifolds are coaxial such that the negative pressure manifold 180 (e.g., through conduit 66) is interior and one or more positive pressure gas stream manifold 182 are disposed coaxially about the negative pressure manifold 180, however such a relationship is not required. Each of the one or more positive pressure gas stream manifolds 182 may have its own DC motor 154 and fan 156, or one or more positive pressure gas stream manifolds 182 may share a DC motor 154 and fan 156. Splitting the positive pressure gas stream into multiple positive pressure gas stream manifolds 182 may allow the user 16 to close off one or more of the positive pressure gas stream manifolds 182 such that the positive pressure gas stream only flows through the open positive pressure gas stream manifolds 182. A configuration that allows the user 16 to close off one or more of the positive pressure gas stream manifolds 182 may offers more flexibility, allowing for desirable gas stream when the positive pressure head is positioned in a confined space (e.g., positioned horizontally above a work surface, up against a wall, or in a corner). If the positive pressure gas stream was through a single positive pressure gas stream manifold, covering about 360 degrees, and the positive pressure head 36 were positioned in a confined space (e.g., the corner of a room), the positive pressure air flow would deflect off the nearby surfaces, creating an undesirable gas stream and preventing the formation of a negative pressure zone and a positive pressure zone. This will be described in more detail with regard to FIGS. 11 and 12. By maintaining a positive pressure zone and a negative pressure zone, overall performance of the extractor system 10 may be improved.

FIG. 7A shows an embodiment in which two positive pressure gas stream manifolds 182 coaxially surround the negative pressure manifold 180. As was discussed previously, each positive pressure gas stream manifold 182 may have its own DC motor 154 and fan 156, or the two positive pressure gas stream manifolds shown in FIG. 7A may share a DC motor 154 and fan 156. Additionally, one or more of the positive pressure gas stream manifolds 182 may include a way to restrict the gas stream to one or both of the positive pressure gas stream manifolds 182 (e.g., a slider barrier, a louvered barrier, a valve, etc.), or change the balance of pressure between each manifold 182.

FIG. 7B shows an embodiment in which three positive pressure gas stream manifolds 182 coaxially surround the negative pressure manifold 180 through conduit 66. Each positive pressure gas stream manifold 182 may have its own DC motor 154 and fan 156, or the one or more of the three positive pressure gas stream manifolds shown in FIG. 7B may share a DC motor 154 and fan 156. If one or more of the positive pressure gas stream manifolds 182 share a DC motor 154 and fan 156, one or more of the positive pressure gas stream manifolds 182 may include a way to restrict the gas stream to one or both of the positive pressure gas stream manifolds 182 (e.g., a slider barrier, a louvered barrier, a valve, etc.), or change the balance of pressure between each manifold 182.

FIG. 7C shows an embodiment in which four positive pressure gas stream manifolds 182 coaxially surround the negative pressure manifold 180 through conduit 66. Each of the four positive pressure gas stream manifold 182 may have its own DC motor 154 and fan 156, or one or more of the four positive pressure gas stream manifolds shown in FIG. 7B may share a DC motor 154 and fan 156. If one or more of the positive pressure gas stream manifolds 182 share a DC motor 154 and fan 156, one or more of the positive pressure gas stream manifolds 182 may include a way to restrict the gas stream to one or both of the positive pressure gas stream manifolds 182 (e.g., a slider barrier, a louvered barrier, a valve, etc.), or change the balance of pressure between each manifold 182.

Figure 8:
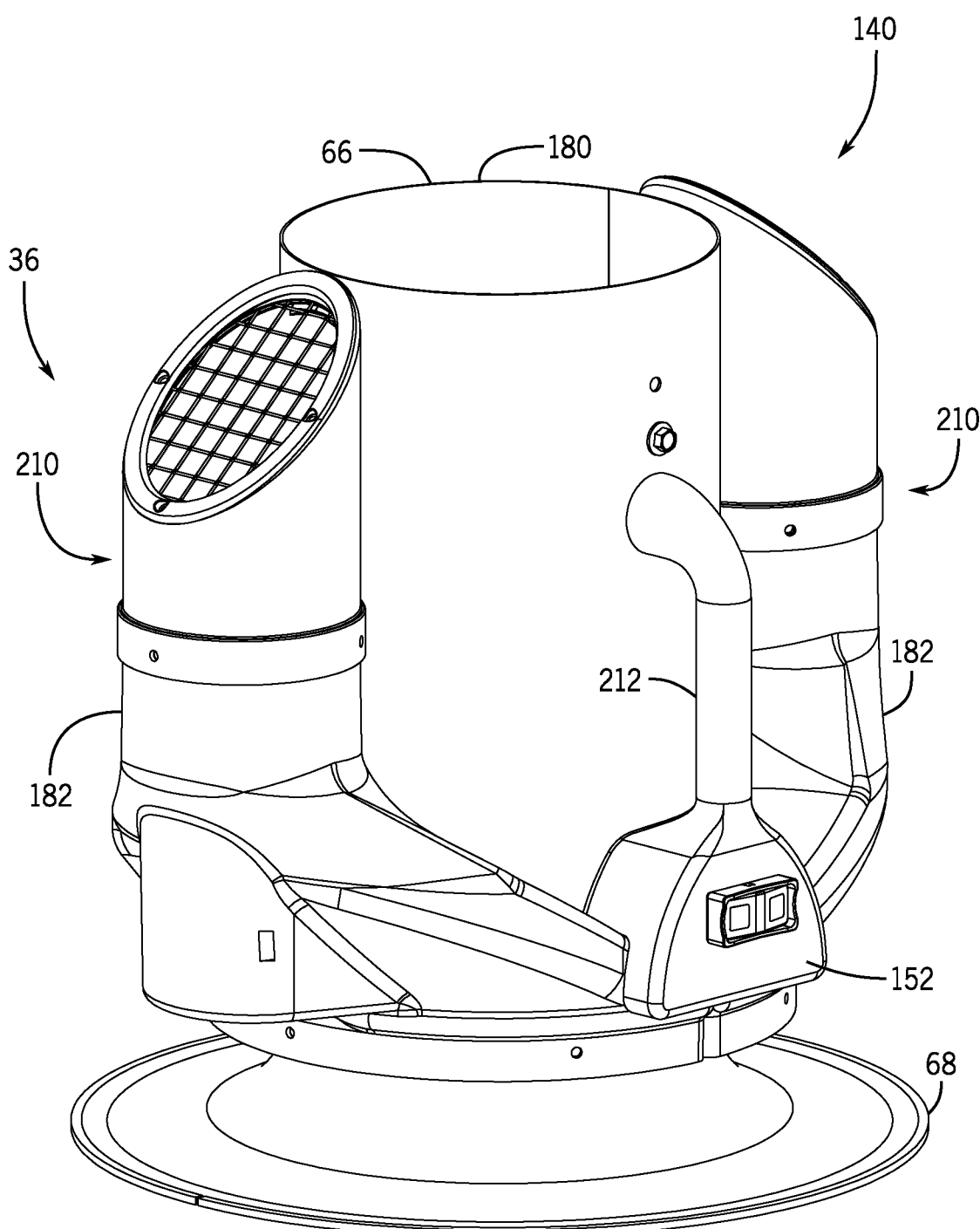
FIG. 8 is a perspective view of one embodiment of the positive pressure head in accordance with aspects of the present disclosure.

FIG. 8 shows a perspective view of one embodiment of the positive pressure system 140 in which the positive pressure head 36 includes two positive pressure assemblies 210, each having a positive pressure gas stream manifold 182, disposed coaxially about the negative pressure manifold 180 (e.g., conduit 66). The configuration shown in FIG. 8 is the same as the configuration shown in FIG. 7A (i.e., two positive pressure gas stream manifolds 182 surrounding a negative pressure manifold 180). The specific components of each positive pressure assembly 210 will be discussed in more detail with regard to FIG. 9.

The positive pressure head 36 may include one or more operator interfaces 152, which may be integrated with one or more handles 212. The operator interface will be discussed in more detail with regard to FIG. 10. There may be a handle and/or an operator interface 152 for each positive pressure assembly 210, or the positive pressure head 36 may include a single handle and/or operator interface 152.

The extraction system 10 may include a negative pressure system 60 with a positive pressure system 140 including a positive pressure head 36 disposed at the end of the conduit 66 near the hood 68. In some embodiments, the positive pressure system 140 may be sold or provided separately from the negative pressure system 60 such that the positive pressure system 140 may be an add-on or a retro-fit to an extraction system 10 that only uses negative pressure to extract smoke, fumes, or other airborne components.

Additionally, it should be understood that the positive pressure head 36 shown in FIG. 8 is merely one possible embodiment. The one or more DC motors 154, fans 156, or other positive pressure gas stream sources, may be positioned away from the arm 30 (e.g., on the floor nearby) and ducted to the end 32 of the arm 30 near the hood 68. Additionally, the positive gas stream could be provided by a ducted fan, a centrifugal blower, turbo powered plans, etc. In other embodiments, compressed air may be used as a source of positive pressure gas stream. Alternatively, the positive pressure gas stream may be created outside of the work cell 12 (e.g., a central ducted positive pressure system) and ducted into the work cell and to the end of the extraction arm 30.

Figure 9:
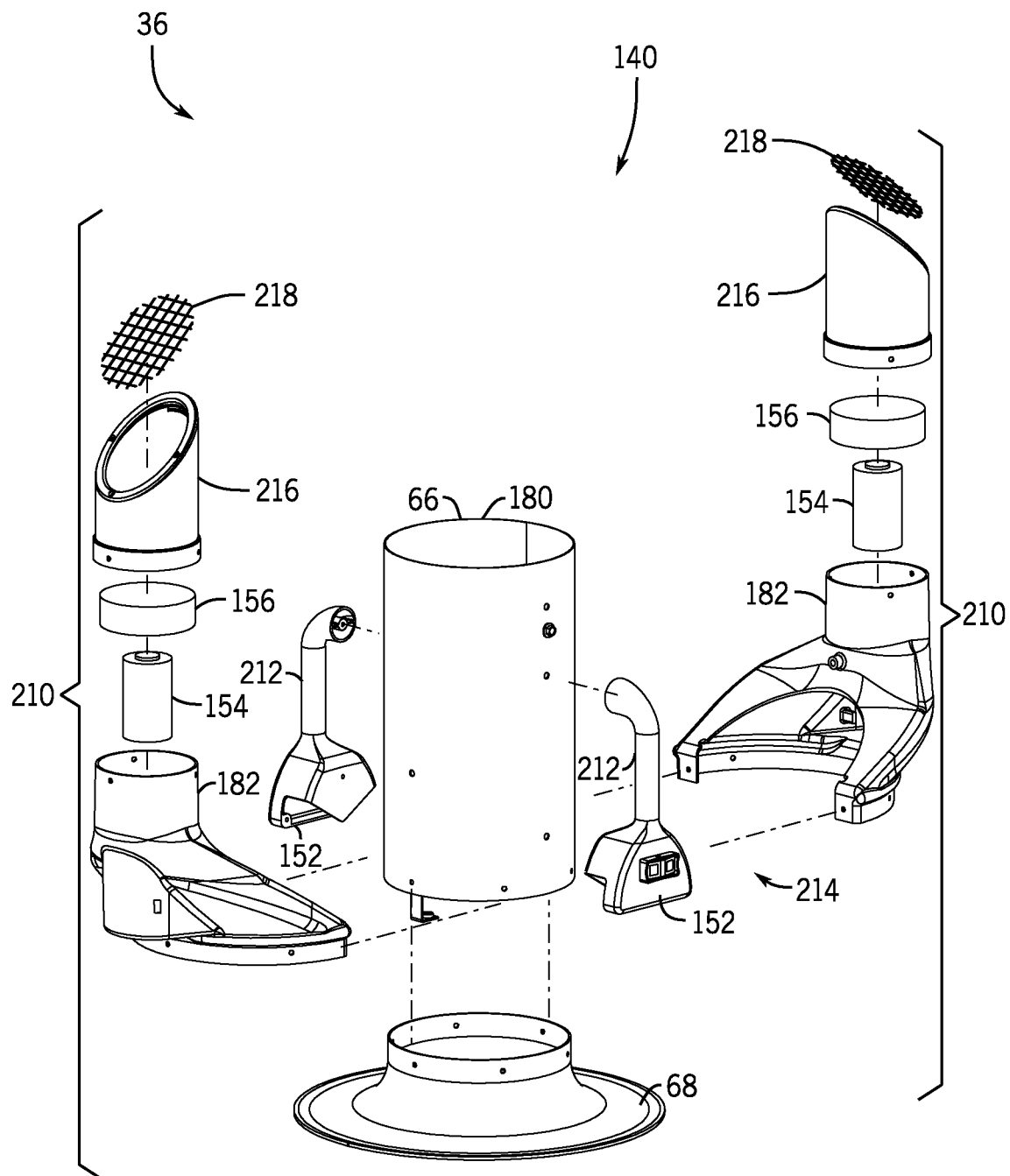
FIG. 9 is an exploded view of the positive pressure head in accordance with aspects of the present disclosure.

FIG. 9 shows an exploded perspective view of the positive pressure head 36. Though the positive pressure head 36 shown in FIG. 9 includes two positive pressure assemblies 210, it should be understood that other embodiments of the positive pressure head 36 may include a different number of positive pressure assemblies 210. For example, the positive pressure head 36 may include, 1, 2, 3, 4, 5, 6, 7, 8, or more positive pressure assemblies 210. Additionally, each positive pressure assembly 210 need not include the specific combination of components shown in FIG. 9. That is, the positive pressure head may have positive pressure assemblies without one or more of the components shown in FIG. 9. Conversely, the positive pressure head may have positive pressure assemblies that include additional components not shown in FIG. 9. As shown in FIG. 9, the positive pressure assemblies 210 may be disposed about the negative pressure manifold (e.g., conduit 66) and joined by a handle assembly 214, which may include a handle 212 and an operator interface 152. The number of handle assemblies 214 may or may not be the same as the number of positive pressure assemblies 210 in the positive pressure system 140. In the embodiment shown in FIG. 9, the positive pressure head 36 includes one handle assembly 214 for each positive pressure assembly 210. However, there may be a single handle assembly 214 for multiple positive pressure assemblies 210, or various other combinations of positive pressure assemblies 210 and handle assemblies 214.

Each positive pressure assembly 210 may include a positive pressure gas stream manifold 182, a DC motor 154, a fan 156, an end cap 216, and a screen 218. The positive pressure gas stream manifold 182 and the end cap 216 may be referred to collectively as the housing. The motor 154 rotates the fan 156 at high speed (e.g., 12,000 rpm) and creates a positive pressure gas stream through the positive pressure gas stream manifold 182. The positive pressure gas stream manifold 182 may include one or more blast gates or pinch manifolds to create a more even positive pressure gas stream. The DC motor 154 may be configured to operate at 24 volts DC, 48 volts DC, or some other voltage. The fan 156 may be a lightweight high speed fan blade configured to rotate in excess of 12,000 rpm. In FIG. 9, the DC motor 154 is disposed downstream of the fan 156 such that the air passing by the DC motor 154 cools the DC motor 154 by convection. However, the DC motor 154 may be located upstream of the fan 156. The positive pressure assembly 210 may or may not include a cooling system. The rotating fan 156 draws air through an end cap 216, which may be equipped with one or more screens 218 or some other kind of filter in order to prevent debris from being drawn into the positive pressure assembly. The end cap 216 supports the one or more screens 218 and provides unrestricted gas stream into the fan 156. The positive pressure gas stream manifold 182 guides the positive pressure gas stream radially outward to create a positive pressure zone. The positive pressure gas stream manifold may also act as a mount for the DC motor 154, and/or house the wiring for the DC motor 154. The positive pressure assembly 210 may be configured to discharge between approximately 400 and 900 cubic feet per minute (cfm). For example, the positive pressure assembly 210 may be configured to discharge 100, 150, 200, 250, 300, 350 400, 450, 500, 550, 600, 650, 700, 750, 800, 850, 900 cubic feet per minute, or anywhere in between, or greater, or less than.

It should be understood, that FIG. 9 merely depicts one embodiment of the positive pressure head 36 and that other embodiments may be possible. For example, as previously discussed, multiple positive pressure gas stream manifolds 182 may share a single DC motor 154 and/or fan 156. Additionally, the positive pressure system 140, the DC motor 154 and fan 156, or other source of positive pressure gas stream for providing a positive pressure air flow may be located away from the positive pressure head 36, and the positive pressure air flow may be ducted to the positive pressure head. In such a configuration, each positive pressure assembly may only include a positive pressure gas stream manifold.

Figure 10:
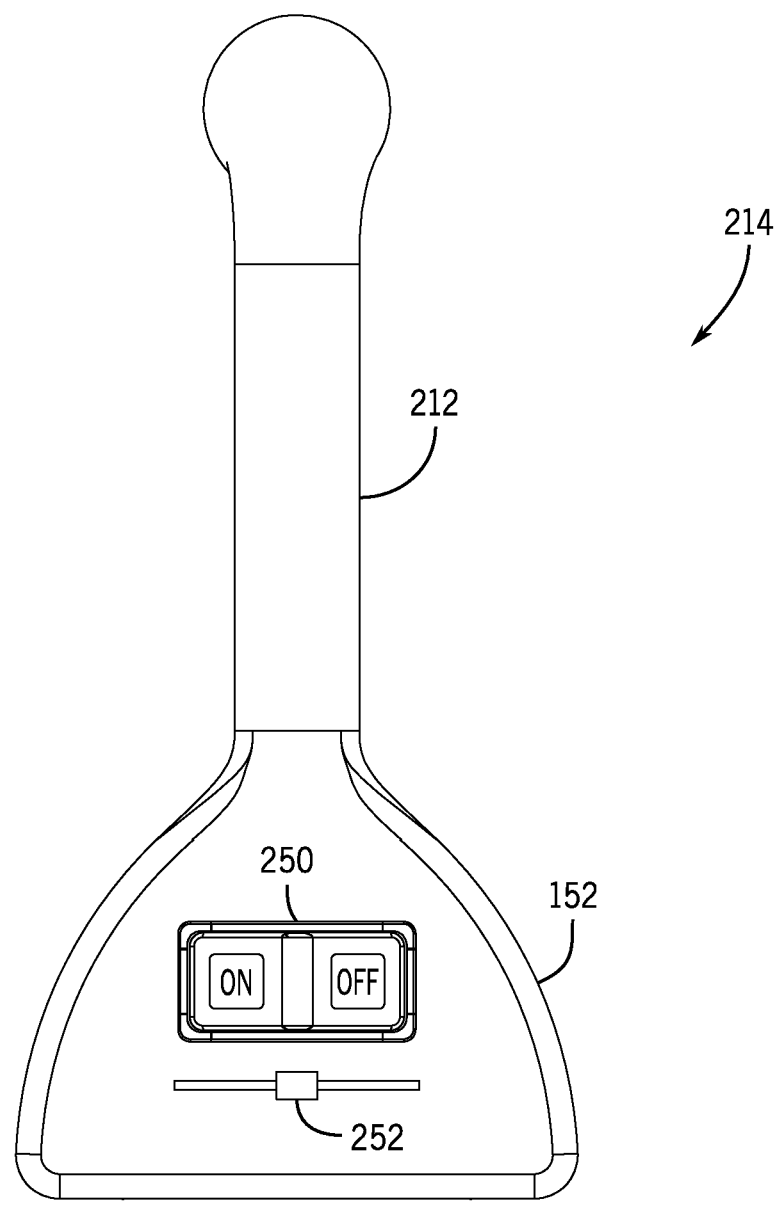
FIG. 10 shows one embodiment of the handle assembly in accordance with aspects of the present disclosure.

FIG. 10 shows one embodiment of the handle assembly 214. As previously discussed, the handle assembly 214 may include a handle 212 and an operator interface 152. The handle 212 may be used by the user 16 to position the positive pressure head 36 in the desired location (e.g., near the work surface 14). The handle assembly 214 may also include an operator interface 152. The operator interface 152 may include a display (e.g., one or more LEDs, a screen, etc.) and/or user inputs (e.g., buttons, knobs, sliders, etc.) or something that acts as both a display and a user input (e.g., a touchscreen). In the embodiment shown in FIG. 10, the operator interface 152 includes buttons 250, which may include an "on" button and an "off" button, an SPDT switch, or some other combination of buttons (e.g., a button for each motor or fan). The operator interface 152 shown in FIG. 10 also includes a slider 252 (e.g. potentiometer), which could be used to control the fan 156 speed of the positive pressure assembly, to operate louvers which act to restrict the gas stream through the positive pressure gas stream manifold, or some other action appropriate for a slider. In some embodiments, the operator interface 80 may not be mounted on the positive pressure head 36, but on the helmet 22, on the tool 20, or elsewhere within the reach of the user. The operator interface 152 may not be mounted on the positive pressure head, but out of reach of the user 16. In such an embodiment, the system may include a remote control on a fob, on the helmet 22, or on the tool 20. In some embodiments, the extractor system 10 may be started automatically, triggered by an arc sensor to sense with the user 16 begins working. The positive pressure system 140 may be shut off based on a timer. For example, the helmet 22 may be outfitted with a sensor 24 (e.g., a light sensor or a motion sensor). When the sensor indicates that the user 16 has stopped working (e.g., no movement, no light, etc.) a timer may be triggered. Upon expiration of the timer, the positive pressure system 140 may shut off. Each positive pressure assembly may be outfitted with a sensor (e.g., proximity sensor) to sense the proximity of a nearby surface (e.g., work surface 14 or wall), at which point the control circuitry 146 may turn off the positive pressure assembly 210 pointed in the direction of the surface.

Figure 11:
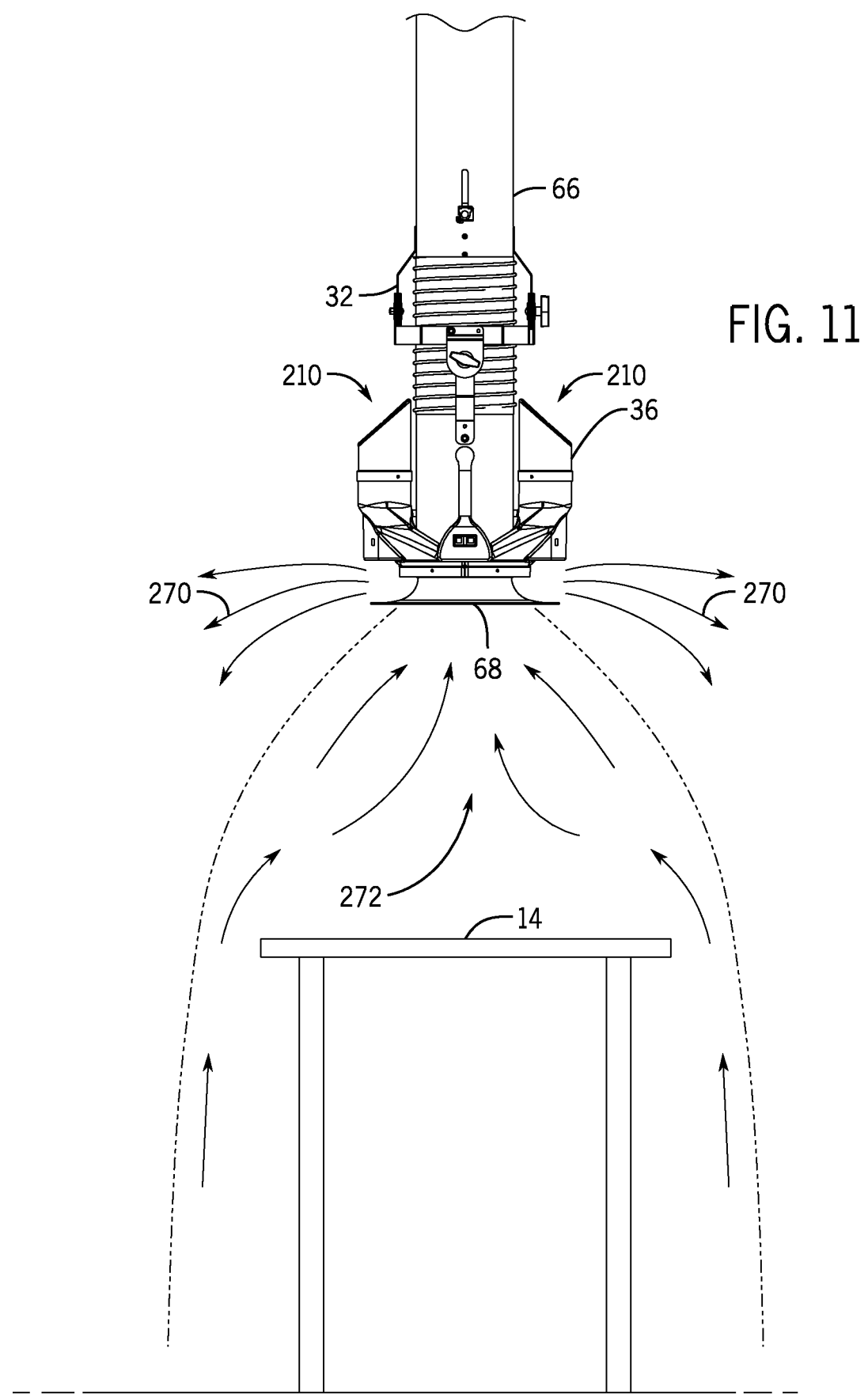
FIG. 11 shows one embodiment of the positive pressure head mounted to the conduit of a negative pressure system, creating a positive pressure zone around a negative pressure zone in accordance with aspects of the present disclosure.

As previously discussed, the various positive pressure assemblies of the positive pressure head work in conjunction to create a positive pressure zone and attach to the negative pressure manifold (e.g., conduit 66) of a negative pressure system 60, which creates a negative pressure zone. The combination of the positive pressure zone and the negative pressure zone may improve the overall performance of the extraction system 10. For example, the creation of a positive pressure zone around the negative pressure zone may enlarge the capture zone from 12-18 inches to approximately 60 inches. FIG. 11 shows a positive pressure head 36 mounted to the conduit 66 of a negative pressure system 60, creating a positive pressure zone 270 around a negative pressure zone 272 (as indicated by the different arrow directions). In the embodiment shown in FIG. 11, air is flowing out of all of the positive pressure gas stream manifolds 182 such that the positive gas stream blows radially outward from the entire circumference (e.g., 360 degrees) of the conduit 66. This configuration (i.e., all positive pressure assemblies on) works well when there are no surfaces (e.g., walls, tables, etc.) nearby to interfere with the formation of the positive pressure zone 270 around the negative pressure zone 272. However, when there are surfaces near the positive pressure head 36 that may interfere with the formation of a positive pressure zone (e.g., the positive pressure head 36 is being used in a confined space), it may be helpful to limit the gas stream through one or more of the positive pressure gas stream manifolds 182 in order to form a positive pressure zone 270.

Figure 12:
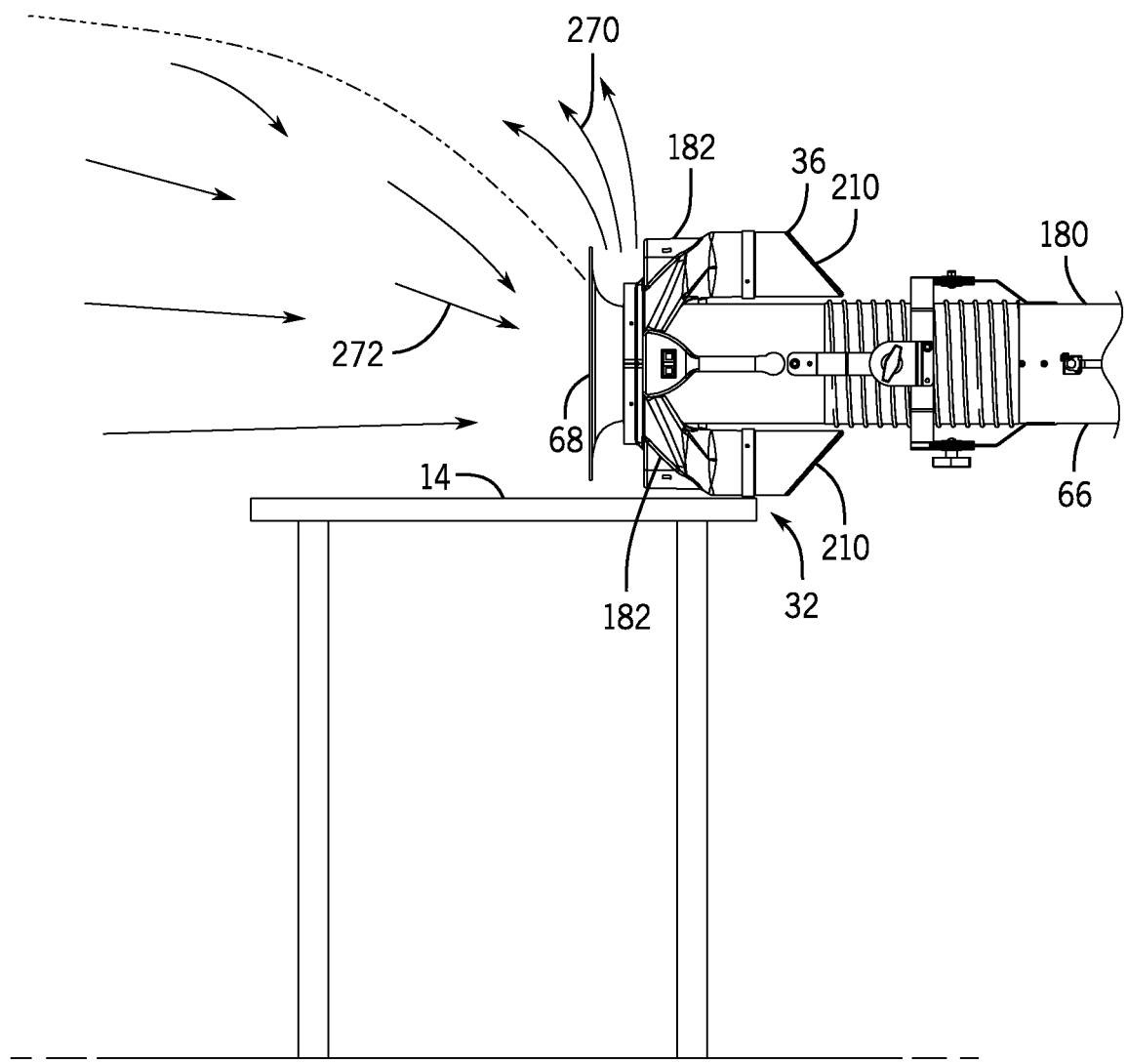
FIG. 12 is shows one embodiment of the extraction system in which the conduit extends horizontally, substantially parallel to the work surface, and in which the gas stream through the positive pressure gas stream manifold closest to the work surface is limited in accordance with aspects of the present disclosure.

FIG. 12 shows on embodiment of the extraction system 10 in which the conduit 66 extends horizontally, substantially parallel to the work surface 14, and in which the gas stream through the positive pressure gas stream manifold 182 closest to the work surface 14 is limited. In the configuration shown in FIG. 12 (i.e., one of the positive pressure assemblies 210 facing a nearby surface), if the air was flowing through the positive pressure gas stream manifold 182 nearest the work surface 182, the air would deflect off of the work surface 14 and may inhibit the formation of a positive pressure zone 270 and the negative pressure zone 272. By allowing the user to restrict or prevent positive gas stream through one or more of the positive pressure gas stream manifolds 182, the extraction system 10 may be capable of extracting smoke, fumes, and airborne components in a wider range of positions. As was previously discussed, restricting the positive gas stream through one or more of the positive pressure gas stream manifolds may be done in any number of ways (e.g., turning off the DC motor 152 or reducing the fan 156 speed for the desired positive pressure gas stream manifold 182, blocking or restricting the gas stream through the positive pressure gas stream manifold 182, redirecting the gas stream through the positive pressure gas stream manifold, etc.).

Figure 13A:
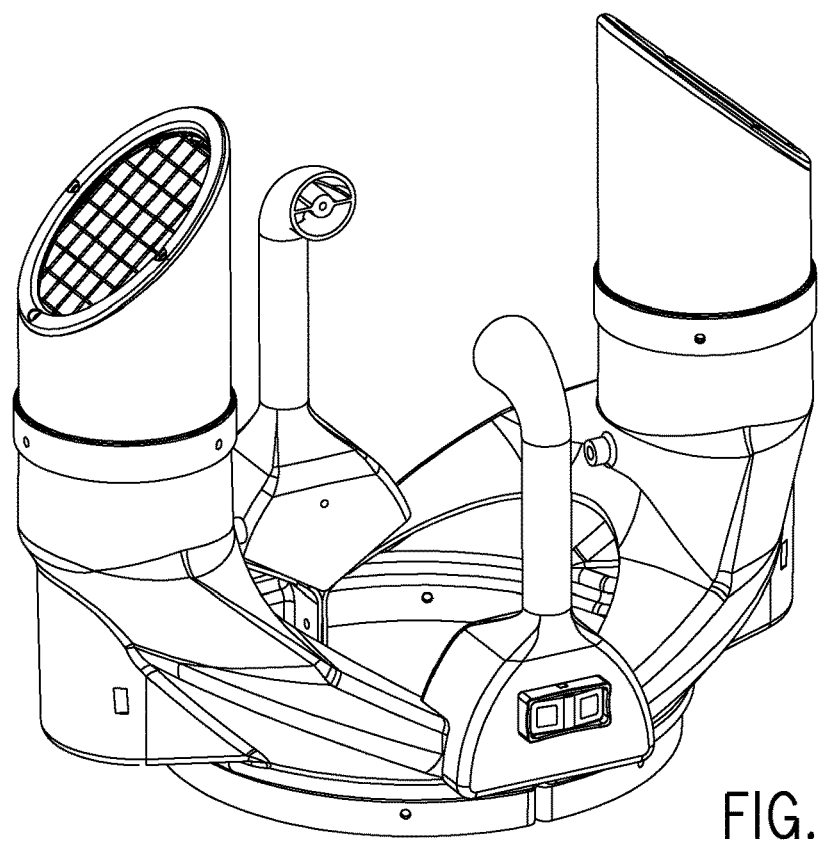
FIG. 13A shows the positive pressure head in a slip-on configuration in accordance with aspects of the present disclosure.
Figure 13B:
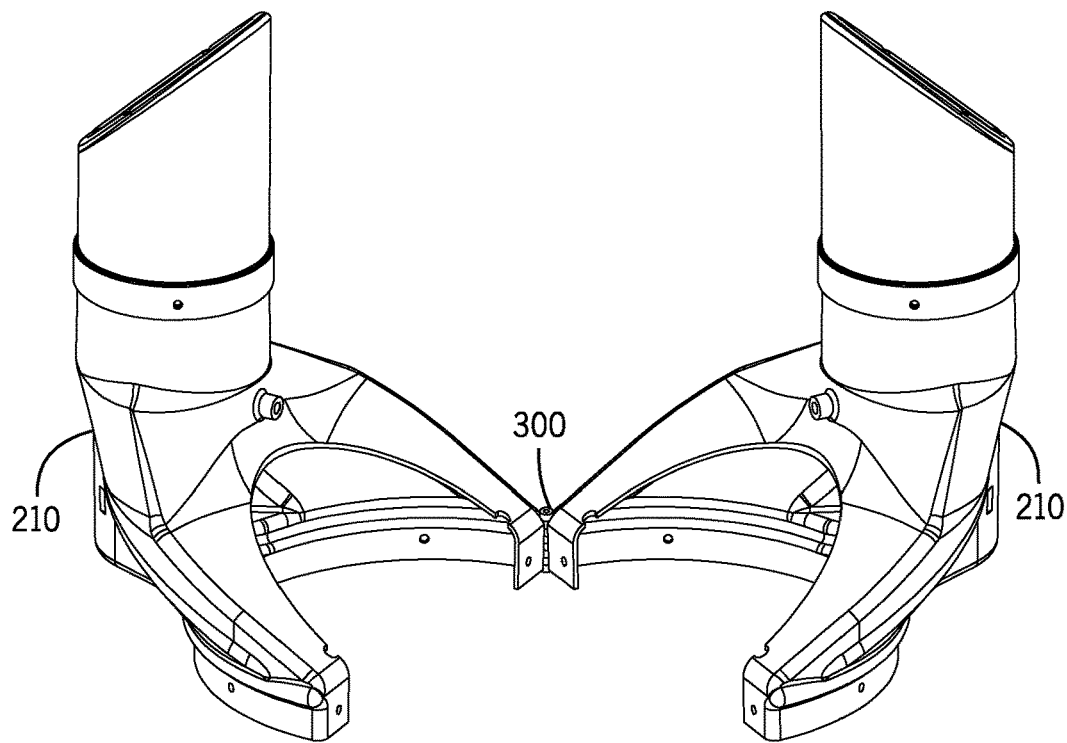
FIG. 13B shows the positive pressure head in a hinged configuration in accordance with aspects of the present disclosure.

FIGS. 13A and 13B show two different ways that a positive pressure head may be attached to the conduit 66 of a negative pressure system. FIG. 13A shows the positive pressure head in a slip-on configuration. In the positive pressure head 36 shown in FIG. 13A, the hood 68 is removed from the end of the conduit 66 and the positive pressure head slipped over the conduit 66. The positive pressure head 36 may then be held in place by screws, dowel pins, snaps, straps, or some other kind of fastener. FIG. 13B shows the positive pressure head in a hinged configuration. In the positive pressure head 36 shown in FIG. 13B, one or more positive pressure assemblies may be attached by one or more hinges 300, and be configured to wrap around the conduit 66 without requiring removal of the hood 68. The positive pressure head 36 may then be held in place by screws, dowel pins, snaps, straps, or some other kind of fastener. It should be understood, however, that FIGS. 13A and 13B and not intended to restrict the claimed subject matter, but are merely intended to be two examples of many ways that the positive pressure head 36 may be attached to the conduit 66.

Technical effects of the disclosed techniques include a self-contained end-mounted positive pressure system for use with a negative pressure extraction system. The positive pressure system may be provided as an a la carte, aftermarket, or retrofit assembly.

While only certain features of the present disclosure have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. An extractor system comprising:
a negative pressure gas stream source;
a negative pressure conduit configured to convey a negative pressure gas stream from a work area, wherein a first end of the negative pressure conduit is coupled to the negative pressure gas stream source, such that the negative pressure gas stream is conveyed from the work area through a second end of the negative pressure conduit and toward the first end of the negative pressure conduit; and
a plurality of positive pressure gas stream sources and a plurality of positive pressure gas stream manifolds coupled to the negative pressure conduit only near the second end of the negative pressure conduit such that each of the positive pressure gas stream manifolds is disposed at a respective radial segment about the negative pressure conduit,
wherein each of the positive pressure gas stream manifolds includes an end cap,
wherein each of the plurality of positive pressure gas stream sources is configured to draw air into the end cap and direct the air as a positive pressure gas stream through the positive pressure gas stream manifold; and
one or more operator interfaces to control a speed of each positive pressure gas stream through a respective positive pressure gas stream manifold independently of the negative pressure gas stream.

2. The extractor system of claim 1, wherein the plurality of positive pressure gas stream manifolds are configured to be retrofitted to an existing negative pressure conduit.

3. The extractor system of claim 1, wherein each positive pressure gas stream manifold is configured to direct the positive pressure gas stream radially outwardly.

4. The extractor system of claim 1, wherein the plurality of positive pressure gas stream sources comprises a first positive pressure gas stream source and a second positive pressure gas stream source, wherein each of the first and second positive pressure gas stream sources are coupled to a respective positive pressure gas stream manifold, each positive pressure gas stream source comprising a motor coupled to a fan.

5. The extractor system of claim 4, wherein the fan of the first positive pressure gas stream source is disposed upstream of the motor of the first positive pressure gas stream source.

6. The extractor system of claim 1, wherein each positive pressure gas stream source comprises a centrifugal blower, a turbo powered fan, a source of compressed air, or a combination thereof.

7. The extractor system of claim 1, wherein the one or more operator interfaces are configured to allow a user to individually control the positive pressure gas stream through each positive pressure gas stream manifold.

8. The extractor system of claim 7, wherein the one or more operator interfaces comprise user inputs for turning each respective positive pressure gas stream source on and off.

9. The extractor system of claim 7, wherein the one or more operator interfaces is configured to allow the user to individually limit airflow through each positive pressure gas stream manifold.

10. An extractor system comprising:
a negative pressure system comprising:
a negative pressure gas stream source; and
a negative pressure conduit comprising: a first end coupled to the negative pressure gas stream source; and
a second end disposed near a work area, wherein a negative pressure gas stream is conveyed from the work area, through the second end, and toward the first end; and
a positive pressure system comprising:
a plurality of positive pressure gas stream manifolds configured to be removably coupled to the negative pressure conduit only near the second end of the negative pressure conduit, wherein a positive pressure gas stream from a plurality of positive pressure gas stream sources source is directed through each of the positive pressure gas stream manifolds, each of the positive pressure gas stream manifolds being disposed at a respective radial segment about the negative pressure conduit, wherein each positive pressure gas stream manifold comprises an end cap, and each positive pressure gas stream source comprises a variable speed motor configured to drive a fan to draw air into the end cap to generate a positive pressure gas stream for the respective positive pressure gas stream manifold.

11. The extractor system of claim 10, comprising an operator interface, wherein the operator interface is configured to allow a user to individually control the positive pressure gas stream through each positive pressure gas stream manifold.

12. The extractor system of claim 10, wherein each positive pressure gas stream manifold is configured to direct the positive pressure gas stream radially outwardly.

13. The extractor system of claim 10, wherein the fan is disposed upstream of the motor.

14. The extractor system of claim 13, wherein the positive pressure system comprises a screen disposed upstream of the fan, through which the fan draws ambient air.

15. The extractor system of claim 10, wherein the positive pressure system is retrofitted to an existing negative pressure system.

16. The extractor system of claim 10, wherein the positive pressure system is configured to be attached to the negative pressure conduit without the use of tools.

17. The extractor system of claim 16, wherein the positive pressure system is configured to be attached to the negative pressure conduit using a strap.

18. A method comprising:
removably coupling a positive pressure system to a first end only of a negative pressure conduit of a negative pressure system, wherein a negative pressure gas stream source is coupled to a second end of the negative pressure conduit that directs a negative pressure gas stream from a work area through the first end of the negative pressure conduit and toward the second end, and
wherein the positive pressure system comprises a plurality of positive pressure gas stream manifolds,
wherein the positive pressure system is disposed coaxially about the negative pressure conduit, and each of the plurality of positive pressure gas stream manifolds is disposed at a respective radial segment about the negative pressure conduit,
wherein each of the positive pressure gas stream manifolds includes a positive pressure gas stream source comprising a fan and a fan motor,
each of the positive pressure gas stream manifolds comprising an end cap, wherein each of the positive pressure gas stream sources are configured to draw air into the end cap to generate a positive pressure gas stream for a respective positive pressure gas stream manifold; and
controlling a speed of one or more fan motors of the plurality of positive pressure gas stream manifolds independently of the negative pressure gas stream.

19. The method of claim 18, comprising: removing a hood from the first end the negative pressure conduit; and slipping the positive pressure system over the first end of the negative pressure conduit.

20. The method of claim 18, wherein the positive pressure system comprises a hinge assembly and coupling the positive pressure system to the first end of the negative pressure conduit of the negative pressure system comprises wrapping the positive pressure system around the negative pressure conduit.

21. The method of claim 18, wherein coupling the positive pressure system to the first end of the negative pressure conduit of the negative pressure system comprises securing the positive pressure system with a strap.

22. The method of claim 18, wherein coupling the positive pressure system to the first end of the negative pressure conduit of the negative pressure system comprises securing the positive pressure system with fasteners.

23. The extractor system of claim 1, wherein each of the plurality of positive pressure gas stream manifolds are disposed in a respective housing.

24. The extractor system of claim 10, wherein each of the plurality of positive pressure gas stream manifolds are disposed in a respective housing of the positive pressure system.

25. A retrofit kit comprising:
one or more positive pressure gas stream manifolds configured to be removably coupled to a negative pressure conduit near one end of the negative pressure conduit, wherein each of the positive pressure gas stream manifolds includes an end cap, a fan, and a fan motor, the fan configured to draw air into the end cap and direct the air as a positive pressure gas stream through the positive pressure gas stream manifold at a respective radial segment about a circumference of the negative pressure conduit, wherein each segment is less than the circumference of the negative pressure conduit.

26. The retrofit kit of claim 25, wherein each positive pressure gas stream manifold is configured to direct the positive pressure gas stream radially outwardly.

27. The retrofit kit of claim 25, wherein the fan is disposed upstream of the motor.

28. The retrofit kit of claim 25, wherein each fan comprises a centrifugal blower, a turbo powered fan, a source of compressed air, or a combination thereof.

29. The retrofit kit of claim 25, comprising an operator interface configured to allow a user to individually control the positive pressure gas stream through each positive pressure gas stream manifold.

30. The retrofit kit of claim 29, wherein the operator interface comprises user inputs for turning the positive pressure gas stream on and off.

31. The retrofit kit of claim 29, wherein the operator interface is configured to allow the user to individually limit airflow through each positive pressure gas stream manifold.

32. The retrofit kit of claim 25, comprising a hinge assembly configured to couple the retrofit kit to the axial end of the negative pressure conduit when the retrofit kit is wrapped around the negative pressure conduit.

33. The retrofit kit of claim 25, comprising a strap configured to secure the retrofit kit to the axial end of the negative pressure conduit.

34. The retrofit kit of claim 25, comprising fasteners configured to secure the retrofit kit to the axial end of the negative pressure conduit.

\* \* \* \* \*